United States Patent [19]

Schmölzer et al.

[11] 4,212,779
[45] Jul. 15, 1980

[54] CATHODICALLY DEPOSITABLE BINDERS

[75] Inventors: Gerhard Schmölzer; Heiner Verdino, both of Graz, Austria

[73] Assignee: Vianova Kunstharz, A.G., Vienna, Austria

[21] Appl. No.: 878,772

[22] Filed: Feb. 17, 1978

[30] Foreign Application Priority Data

Feb. 18, 1977 [AT] Austria .................................. 1087/77

[51] Int. Cl.$^2$ .......................... C09D 3/58; C09D 3/66; C09D 5/02; C09D 5/40
[52] U.S. Cl. .......................... 260/22 CQ; 260/22 CB; 260/29.2 N; 260/29.2 E; 260/29.2 EP; 204/181 C
[58] Field of Search ............... 204/181 C; 260/22 CQ, 260/22 CB, 29.2 N, 29.2 E, 29.2 EP

[56] References Cited

U.S. PATENT DOCUMENTS

| | | | |
|---|---|---|---|
| 3,679,564 | 7/1972 | Dowbenko et al. | 204/181 C |
| 3,839,252 | 10/1974 | Bosso et al. | 204/181 C |
| 3,882,188 | 5/1975 | Behmel | 204/181 C |
| 3,928,156 | 12/1975 | Wismer et al. | 204/181 C |
| 3,971,708 | 7/1976 | Davis et al. | 204/181 C |
| 3,984,382 | 10/1976 | Parekh et al. | 204/181 C |
| 4,001,101 | 1/1977 | Bosso et al. | 204/181 C |

FOREIGN PATENT DOCUMENTS

| | | | |
|---|---|---|---|
| 1306102 | 2/1973 | United Kingdom | 204/181 C |
| 1413054 | 11/1975 | United Kingdom | 204/181 C |

Primary Examiner—Ronald W. Griffin
Attorney, Agent, or Firm—A. W. Breiner

[57] ABSTRACT

Binders for cathodically depositable aqueous coating compositions comprising a basic binder system which is the blend or partial reaction product of a basic macromolecular component and an acidic macromolecular component, the ratio between acid and basic groups as expressed by amine value and acid value ranging between 97:3 and 65:35, the basic content of the binders being neutralized with organic or inorganic acids. The binders provide better crosslinking at usual curing temperatures thus yielding films with enhanced resistance characteristics.

11 Claims, No Drawings

CATHODICALLY DEPOSITABLE BINDERS

The present invention is concerned with improved coating compositions based on heat-hardenable binder systems water dilutable upon partial or total neutralisation of their basic groups with acids. These coating compositions are particularly suitable for cathodic deposition according to the electrodeposition process.

The film formation of paint binders, unless they dry by solvent evaporation, is effected either by oxidation, polyesterification, or poly-reesterification, polyetherification, polymerisation or other reactions at the functional groups, optionally at elevated temperatures. Since the curing reactions show satisfactory speed only with acidic medium, cationic binders in general have the disadvantage that at the stoving temperatures normally applied they show unsatisfactory cure. This is, i.e. reflected in insufficient resistance to salt spray, water, steam, solvents or other chemical impact. By raising the curing temperature these disadvantages may be set off to a minor degree, however, such high levels of temperature are not desirable in practical application. With these facts the range for the use of cathodic binders is narrowed considerably.

In order to prevent such difficulties various references, e.g. German specification No. 23 60 098 or German Offenlegungsschrift Nos. 20 03 123, 20 65 775 or 21 42 449 suggest to coemploy salts or esters of acids, like p-toluol sulfonic acid or boric acid which act as acid catalysts during the stoving reaction. Through this measure, it is true, hardness may be enhanced however there is the hazard of enrichment in the electrodeposition bath owing to insufficient coagulation as is the case with all low-molecular substances. Severe defects of the coating are the indispensable result.

OBJECTS OF THE INVENTION GENERAL DESCRIPTION

Surprisingly it has now been found that cationic coating compositions giving cured films with superior performance may be obtained if their binders carry in the macro-molecular structure in addition to the basic groups a judiciously balanced level of acid groups.

From German Auslegeschrift No. 22 37 114, it is true, binders are known which contain quaternary ammonia Zwitter ions; however, this class of binders has the disadvantage of relatively low voltages only being applicable at cathodic deposition owing to the Zwitter nature of the resins; thus spongy paint films result due to the lack of osmosis which in turn brings about a rough surface on stoving. Furthermore, the deposited films, in the strongly basic medium at the interfacial sections at the cathode are re-dissolutioned by the strongly acidic binder.

With the aid of the present invention, not only are the mentioned difficulties overcome, but also, furthermore, the raw materials basis for cathodic binders is greatly enlarged. The cathodic binders of the present invention based on basic nitrogen atoms containing binder systems optionally containing pigments, extenders, solvents, paint additives and other paint agents are characterised in that the basic binder systems contain a level of acidic groupings, the ratio as expressed in a ratio of amine value to acid value, in mg KOH/g, lying between 97:3 and 65:35.

The coating compositions of the invention are characterised particularly by the fact that at the curing temperatures normal for cathodically deposited paint films the density of cross-linking is one to guarantee the superior paint performance against chemical impact. In many cases the stoving temperatures may be reduced over nowadays' standards. This feature means a considerably handling and economical advantage for the producer of the equipment as well as for the consumer.

From literature various possibilities with a variety of raw materials are known in order to synthetize basic groups containing macromolecules. In the following there is a survey of various synthesis methods, the list claiming an exemplary status but not completeness.

An important group of macromolecules with basic nitrogen atoms is formed by addition reaction of epoxy compounds with secondary amines.

The most popular epoxy groups containing raw materials having in common the general formula

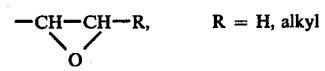

are glycidyl ethers of phenols, particularly of 4,4'-bis(-hydroxyphenyl)propane (Bisphenol A). Similarly well known are the glycidyl ethers of phenol formaldehyde condensates of the Novolaktype, glycidyl esters of aliphatic, aromatic or cycloaliphatic mono- or polycarboxylic acids, glycidyl ethers of aliphatic or cycloaliphatic diols or polyols, copolymers of glycidyl(meth)-acrylate or epoxidation products of aliphatic or cycloaliphatic di- or polyolefines. An elaborate survey of this class of raw materials can be found in A. M. Paquin "Epoxidverbindungen und Epoxyharze", Springer 1958.

Secondary amines suitable for addition to epoxy groups are e.g. dimethylamine, diethylamine or higher homologues or isomers thereof. Secondary alkanol amines are particularly suited, e.g. diethanolamine, diisopropanolamine, or higher homologues or isomers thereof. We would like to further mention cyclic secondary amines like ethylene imine, morpholine, piperidine.

A reaction of the epoxide compounds with primary/tertiary or secondary/secondary diamines leads to compounds with cationic character. It is evident that the epoxy compounds can be modified with other compounds such as mono- or dicarboxylic acids. It is essential that the products carry a sufficient number of basic groups enabling excellent dilution with water upon partial neutralisation with acids.

A still further group of macromolecules with basic nitrogen atoms is obtained through copolymerisation of suitable basic monomers with hydroxyalkyl(meth)acrylates, preferably in the presence of other copolymerisable compounds. Such basic monomers are e.g. among the group of (meth)acrylates, like N,N-dimethylaminoethyl(meth)acrylate. Other suitable monomers with basic nitrogen atoms are e.g. vinyl piridine, N-vinylimidazol, N-vinylcarbazol. Also such compounds are present as copolymers with hydroxyalkyl(meth)acrylates and, preferably, with other (meth)acrylates, (meth)acrylamides, vinyl aromates like styrol, vinyltoluol, α-methyl styrol, etc.

A further group of macromolecules with basic nitrogen atoms are substituted oxazolines, as are f.i. obtained by cyclising condensation of amine alcohols, like trishydroxymethyl aminomethane or 2-amino-2-hydroxymethyl-1,3-propanediol, with aliphatic carboxylic acids or carboxy group containing macromolecules. A comprehensive survey of these oxazolines is given by J. A. Frump, Chemical Review, 1971, vol. 71, no. 5, pp. 483–505. Polyesters with such groups are e.g. mentioned in Austrian patent specification Nos. 309,624; 314,695 or 318,105.

A still further group of macromolecules with basic nitrogen atoms is obtained by addition reaction of anhydride groups containing compounds with alkanol amines, particularly with dialkylalkanolamines, e.g. dimethyl- or diethylethanolamine. The addition reaction is carried out at from 50° to 150° C., preferably 90°–120° C. with semi-ester formation. Suitable starting materials are succinic anhydride derivatives or Diels-Alder adducts as can e.g. be obtained by addition of maleic anhydride to compounds with isolated or conjugated double bonds. Among this group are e.g. adducts of maleic anhydride to unsaturated oils, fatty acids and rosin acids, to diene polymers, unsaturated hydrocarbon resins, etc. Furthermore, copolymers carrying anhydride structures, like styrolmaleic anhydride copolymers can be employed in this sense.

A further possibility to introduce basic nitrogen atoms consists in the reaction of acid anhydride groups or semiesters thereof with diamines carrying one primary and one tertiary nitrogen atom.

In copending application Ser. No. 816,936, filed July 19, 1977, and Austrian application No. 9211/76, filed Dec. 13, 1976, we have described methods to introduce basic groups into macromolecules by reacting hydroxy or carboxy groups containing compounds with basic monoisocyanates.

There are various ways to introduce acid groups into the binder system.

On the one hand it is possible to admix a suitable quantity of a macromolecular compound carrying acid groups to a basic resin in order to obtain the desired effect. On the other hand, a chemical combination between the two components can be effected through reaction of an acidic macromolecular compound or a preliminary stage of it with a basic resin. The acid compounds used according to this method are prepared in a separate reaction step. A preferred group are macromolecular compounds called adducts with a short term in the following. These addition compounds are obtained through reaction of α,β-unsaturated dicarboxylic acids or anhydrides to compounds with the isolated or conjugated double bonds of the macromolecules. In case of adduct formation with anhydrides it is necessary to open the anhydride ring with water or alcohols and to thus set free the carboxy groups. Starting materials for such adducts are unsaturated oil fatty acids, synthetic or natural hydroxy-free esters, mixed esters thereof with rosin acids, as well as diene polymers or hydrocarbon resins.

A still further group of macromolecular compounds with acidic character are the known polyesters or alkyd resins as long as they still carry a sufficient number of free carboxy groups. This is achieved either by interrupting the esterification at the desired acid value or by the formation of partial esters of di- or polycarboxylic acids with hydroxy-rich polyesters with low acid values. Furthermore, for the process of the invention, copolymers can be coemployed which carry free carboxy groups. The preferred copolymers are those with acrylic or vinylaromatic structures, e.g. copolymers of acrylates, styrol, acrylic acid, methacrylic acid, maleic acid derivatives, etc.

The acid components, besides the essential acid groups may contain other functional groups, like hydroxyl groups, amide groups, imine groups and amine groups. If these groups are of basic nature, they have to be considered when calculating the inventive ratio in the binder of the basic and acid groups.

The ratio between the basic and acid groups in the binder system is expressed in the ratio between amine number and acid number (mg KOH/g). The coating compositions of the invention are based on binders with this ratio at between 97:3 and 65:35.

The preparation of the binders of the invention is effected either by mixing the components at temperatures at which a thorough homogeneisation is effected or at up to 200° C., preferably up to 100° C. with partial reaction of the components. Mixing or reaction is preferably carried out in the presence of water tolerant solvents like alcohols, glycol ethers, ketones or ketone alcohols.

The quantity of basic component is preferably chosen such that the basicity of the binder system upon neutralisation guarantees satisfactory dilutability with water at a pH-value of from 4 to 9, preferably 5 to 7. Preferably the binder systems have an amine number of at least 20 mg KOH/g.

Reduction of the stoving temperature or the achievement of superior performance is optionally possible by coemploying known additional crosslinking agents such as urea resins melamine resins or phenol formaldehyde condensates. Such resins are prepared according to known methods by alkaline condensation of formaldehyde and substances splitting off formaldehyde to urea, melamine, benzoguanamine, acetoguanamine, phenol, cresol, p-tert. butyl phenol, Bisphenol A, etc. The methylol compounds may optionally be etherified with alcohols. A preferred product in this group is a reaction product of phenol with formaldehyde carryihg allylether groups in addition. If these crosslinking agents are water insoluble, they are advantageously combined through condensation at temperatures of from 50° to 120° C. The extent of this reaction is carried to an excellent water solubility of the reaction mass upon neutralisation with low molecular organic acids.

The basic nitrogen atoms of the binder system of the invention are neutralised partially or totally with organic and/or inorganic acids. The degree of neutralisation depends upon the individual character of the binder. In general that much acid is added as renders the coating composition in application form water dilutable or water dispersible at a pH-value of from 4 to 9, preferably 5 to 7.

The concentration in water of the binder depends upon the parameters of electrodeposition and may lie in a range of between 3 to 30% by weight, preferably of from 5 to 15% by weight. The applied coating composition may optionally contain various additives, including pigments, extenders, surface active agents, etc.

Upon electrodeposition the binder of the invention as a vehicle of the aqueous coating composition is wired to a conductive anode and cathode, the surface of the cathode being coated with the coating composition. The conductive substrates to be coated may be of a variety of materials, particularly of metals such as steel, aluminum, copper, etc., but also of other metalized materials or materials rendered conductive through a conductive coating.

After deposition, the coating is cured at a stoving schedule of from 130° to 200° C., preferably 150° to 180°

C. for about 5 to 30 minutes, preferably 10 to 25 minutes.

The following examples illustrate the invention without limiting the scope of it:

PREPARATION OF THE INTERMEDIATES

(A) BASIC INTERMEDIATES

Intermediate (A1)

485 g dimethylterephthalate and 555 g neopentylglycol are slowly heated to 170° to 200° C. while stirring and held until the theoretical quantity of methanol has distilled off. Then, 645 g adipic acid are added and at 170° to 200° C. the reaction is carried to an acid value of 131 mg KOH/g. The batch is further reacted at 150° to 160° C. with 415 g trishydroxymethylaminomethane, reheated to 170° to 190° C. and held until the acid value has fallen below 1 mg KOH/g. The reaction product is diluted at 120° C. to a solids content of 75% with ethyleneglycol monoethyletheracetate (hydroxyl value 224 mg KOH/g, amine value 105 mg KOH/g).

Intermediate (A2)

130 g dimethylaminomethylmethacrylate, 150 g 1,4-butanediolmonoacrylate, 420 g styrol, 300 butylacrylate are copolymerised in known manner in 540 g of ethyleneglycolmonoethylether. The reaction product has a solids value of 65%, a viscosity of T-U Gardner-Holdt and an amine number of 46 mg KOH/g.

Intermediate (A3)

475 g of an epoxy resin with an epoxy equivalent of about 450 to 500 and a melting range of 65° to 75° C., are slowly heated to 150° C. together with 105 g of diethanolamine. The batch is kept at this temperature for 3 hours until the content of free epoxy groups has fallen to 0. Thereafter the batch is cooled to 100° C. and diluted to 75% solids with 195 g ethylene glycolmono ethylether (amine number 96 mg KOH/g).

Intermediate (A4)

500 g of linseed oil are reacted at 200° C. in the presence of 5 g of Cu-naphthenate solution, containing 9% metal, with 100 g of maleic anhydride until the content of free anhydride has fallen below 1%. The viscosity of a solution consisting of 80 g of adduct and 40 g of ethyleneglycolmonoethyletheracetate is about 50 s (DIN 53 211), the acid value 170 mg KOH/g. At 150° C., 130 g diethylaminopropylamine are added within 1 hour and the batch is held at 180° C. until all of the amine has reacted. After cooling to 120° C., the batch is diluted to a solids content of 80% with 180 g ethyleneglycol monoethylether (amine number 80 mg KOH/g).

Intermediate (A5)

79 g isononanoic acid, 89 g tall oil fatty acid, 102 g pentaerythritol, 45 1 g trimethylolpropane and 120 g isophthalic acid are reacted at 230° C. to an acid value of below 3 mg KOH/g. The hydroxy group containing polyester has an intrinsic viscosity of 6 ml/g (measured in dimethylformamide at 20° C.) and a hydroxyl number of 250 mg KOH/g and is diluted to a solids content of 60% with 260 g ethyleneglycolmonoethyleractetate. At 60° C., 175 g of a basic isocyanate intermediate prepared from 70 g toluylene diisocyanate (blend of 80% of 2,4- and 20% of 2,6 isomers) and 35 g dimethylethanolamine, 60% in ethyleneglycolmonoethyletheracetate are added and the batch is held until the content of free isocyanate groups has fallen to 0. The product has an amine number of 45 mg KOH/g and a solids content of 60%.

(B) ACIDIC INTERMEDIATES

Intermediate (B1)

In 430 g n-butanol, 150 g acrylamide, 100 g acrylic acid, 410 g iso-octylacrylate, and 430 g styrol are copolymerised in the presence of 20 g azobisisobutyronitrile and 60 g dodecylmerkaptan until a solids content of 70% is obtained (acid value 78 mg KOH/g).

Intermediate (B2)

32 g isononanoic acid, 168 g dehydrated castor oil fatty acid, 136 g pentaerythritol and 120 g isophthalic acid are esterified at 230° C. to an acid value of below 10 mg KOH/g and an intrinsic viscosity of 10.2 to 10.4 ml/g (in dimethylformamide at 20° C.). After cooling to 120° C., 296 g phthalic anhydride are added and the batch is reacted to an acid value of about 150 mg KOH/g. After cooling to 100° C., 306 g ethyleneglycol monoethylether are added to obtain a solids content of 70%.

Intermediate (B3)

400 g of polybutadiene (with a molecular weight of 1400 and a microstructure of 75% of 1,4-cis-configuration and about 25% of 1,4-trans-configuration) and 100 g maleic anhydride are reacted at 200° C. in the presence of 4 g of a Cu-naphthenate solution with a metal content of 9%, until the content of free maleic anhydride has fallen below 1%. The viscosity of a solution consisting of 72 1 g of the adduct and 48 g of ethyleneglycolethyletheracetate is about 80 sec (DIN 53 211), the acid value 200 mg KOH/g. The temperature is reduced to 120° C. and the batch is diluted with 50 g of diacetone alcohol. At 100° C., the adduct is either hydrolysed with water and triethylamine as a catalyst or is semi-esterified with methanol. When the acid value remains constant, the solids content is adjusted to 70% with about 175 g isopropyl alcohol. In case of the hydrolysed adduct, the acid value is around 180 mg KOH/g (B3A), for the semi-esterified one it is around 90 mg KOH/g (B 3B).

Intermediate (B4)

500 g linseed oil and 100 g maleic anhydride are reacted completely as in Intermediate (A4). Then, at 150° C., 65 g diethylaminopropylamine are added within 30 minutes and the batch is held at 180° C. until the amine has reacted completely. Upon cooling to 100° C., it is esterified with 17 g methanol and 1.5 g thiethylamine as catalyst, until the acid value remains constant and is then diluted with 285 g ethyleneglycol monoethylether to 70% solids content. The amine number and the acid number are 42 mg KOH/g each.

EXAMPLES 1-6

According to Table 1 the intermediates, optionally the mentioned crosslinkers are mixed or partially reacted, in the latter case the reaction being carried to an excellent water dilutability only. Blending or reaction with the additional crosslinker may be effected in random sequence. All quantities refer to resin solids.

KEY TO ABBREVIATIONS

BP: condensation product obtained from 1 mole of bisphenol and 4 moles of formaldehyde (resol).

ML: melamine-formaldehyde condensate containing 6 methylol groups, 4 of them at least being etherified with n-butanol.

PA: phenol formaldehyde condensate carrying allyl ether groups (molecular weight 193, viscosity 27–58 Poise/25° C.; iodine number 150–170; hydroxyl number 480–550 mg KOH/g).

TABLE 1

| | intermediates (g) | | crosslinker (g) | | | reaction conditions h/°C. | ratio amine value | | acid value |
|---|---|---|---|---|---|---|---|---|---|
| | | | BP | ML | PA | | | | |
| 1 | 900 A 1 | 100 B3A | | | | 3/120 | 84 | : | 16 |
| 2 | 800 A 2 | 200 B 1 | | | | 1/80 | 70 | : | 30 |
| 3 | 900 A 3 | 100 B 2 | | | 250 | 1/20 | 85 | : | 15 |
| 4 | 850 A 3 | 150 B 4 | | 430 | | 1/60 | 93 | : | 7 |
| 5 | 800 A 4 | 200 B3B | | | | 1/20 | 78 | : | 22 |
| 6 | 925 A 5 | 75 B 2 | 111 | | | 3/80 | 79 | : | 21 |

EXAMPLE 7

500 g polybutadiene with a molecular weight of about 1400 and a microstructure of about 75% 1,4-cis and about 25% 1,4-trans configuration, are reacted at 200° C. in the presence of 5 g copper naphthenate solution (9% copper) with 100 g maleic anhydride, until the content of free maleic anhydride has fallen below 1%. The viscosity of a solution of 80 g adduct and 40 g ethylene glycolmonoethylene acetate is about 60 seconds (DIN 53 211), the acid value 170 mg KOH/g. At 150° C. 104 g diethylaminopropylamine are added within 1 hour and the reaction is carried on at 180° C. until the amine has totally reacted. After cooling to 100° C. the batch is esterified with 7 g methanol and 1 g triethylamine as a catalyst until the acid value remains constant. Then it is diluted with 295 g ethyleneglycolmonoethyl ether to 70% solids. The amine number is about 64 mg KOH/g, the acid value 16 mg KOH/g.

At 80° C., 77 g phenolformaldehyde resin with allyl ether groups (PA) are added and co-condensed, until a sample neutralised with acetic acid is clearly dilutable with water. A solids content of 70% is adjusted with 33 g ethyleneglycol monoethylether (base to acid ratio: 80:20 mg KOH/g).

EXAMPLE 8

238 g dimethylaminoethylmethacrylate, 12 g acrylic, 410 isooctylacrylate and 340 g styrol are copolymerised at 80° C. in a blend of 500 g ethyleneglycolmonoethylether and 500 g n-butanol in the presence of 20 g azobisisobutyronitrile and 60 g dodecylmerkaptane, until the solids content has attained 50%. The amine number of the copolymer is about 85 mg KOH/g, the acid value 9.5 mg KOH/g (base/acid ratio 90:10 mg KOH/g).

EXAMPLE 9

200 g of copolymer of styrol and allyl alcohol with an average molecular weight of 1150 and a hydroxyl number of 250 mg KOH/g are esterified with 280 g tall oil fatty acid at 240° C. until an acid value of below 10 mg KOH/g is attained. At 200° C. 100 g maleic anhydride are added and the batch is reacted at 200° C. to 220° C. until the content of free maleic anhydride has fallen to 0. At 150° C., 91 g diethylaminopropylamine are added and the reaction is carried on at 180° C. until the amine has reacted completely. The batch is cooled to 120° C. and 66 g diacetone are added. At 100° C., the remaining anhydride groups are semi-esterified with 25 g methanol and 3 g triethylamine as catalyst; with 386 g ethyleneglycol monoethylether a solids content of 60% is adjusted. The amine number is about 57 KOH/g, the acid value 24 mg KOH/g. After cooling to 50° C., 285 g of a melamine-formaldehyde resin, etherified to about 70% with n-butanol (60% in n-butanol) are thoroughly admixed (base-acid ratio 70:30 mg KOH/g).

EVALUATION OF THE BINDERS

Each 100 g of the listed binders, resin solids, were mixed with the acids and, while stirring, made up to 1000 g with deionised water. The 10% solutions were cathodically deposited on steel panels. Deposition time was 60 seconds in all cases. The coated substrates were rinsed with deionised water and cured at elevated temperature. Thickness of the curved films averaged 13 to 17 μm. Table 2 gives the compiled results.

TABLE 2

| | neutralisation | | | deposition | | test | | |
|---|---|---|---|---|---|---|---|---|
| | (1) quantity | (2) type | (3) pH | volt | min/°C. | (4) harness | (5) indentation | (6/7) resistance |
| 1 | 11,4 | M | 6,5 | 150 | 30/180 | 160 | 7,9 | 320/120 |
| 2 | 7,4 | M | 5,5 | 180 | 30/170 | 165 | 7,1 | 360/240 |
| 3 | 7,4 | E | 6,0 | 200 | 25/160 | 185 | 8,0 | 480/360 |
| 4 | 6,6 | E | 6,1 | 250 | 30/170 | 180 | 8,5 | 360/240 |
| 5 | 6,8 | E | 6,0 | 230 | 20/180 | 175 | 7,9 | 480/360 |
| 6 | 7,5 | M | 5,6 | 180 | 30/160 | 160 | 8,4 | 320/120 |
| 7 | 6,2 | E | 6,2 | 180 | 30/160 | 160 | 7,1 | 360/240 |
| 8 | 8,0 | E | 6,3 | 160 | 20/200 | 160 | 7,1 | 360/120 |

TABLE 2-continued

| | neutralisation | | | deposition | | test | | |
| | (1) quantity | (2) type | (3) pH | volt | min/°C. | (4) harness | (5) indentation | (6/7) resistance |
|---|---|---|---|---|---|---|---|---|
| 9 | 8,3 | M | 5,8 | 180 | 30/170 | 160 | 7,5 | 360/240 |

(1) quantity of acid, g, per 100 g resin solids
(2) E :acetic acid (80% in water) M: lactic acid (80% in water)
(3) measured on a 10% aqueous solution
(4) Konig pendulum hardness DIN 53 157 (sec)
(5) Erichsen indentation DIN 52 156 (mm)
(6) hours of water soak at 40° C. until blistering and corrosion become visible
(7) ASTM-B-117-64 salt spray: 2 mm of corrosion at the cross-incisison after the recorded hours.

For this test degreased non-pretreated steel panels were coated with a pigmented paint containing 100 parts by weight or resin solids, 20 parts by weight of aluminum silicate pigment and 2 parts by weight of carbon black. In the above illustrative examples various modifications can be made falling within the scope of the claimed invention. Such modifications being within the ability of one skilled in the art are within the scope of the present invention.

It is claimed:

1. Cathodically depositable water dilutable coating compositions comprising a basic binder system comprising a blend or partial reaction product of a basic macromolecular component carrying basic nitrogen groups and an acidic macromolecular component having unreacted carboxyl groups, the ratio of basic groups to acid groups as expressed by the amine number and acid number ranging between 97:3 and 65:35.

2. Coating compositions according to claim 1, comprising a blend of the basic and acid components.

3. Coating compositions according to claim 1, comprising a partial reaction product of the basic and acid components.

4. Coating compositions according to claim 1, wherein the macromolecular acid component includes functional groups in addition to the acid groups.

5. Coating compositions according to claim 4, wherein the acidic macromolecular component contains basic groups.

6. Coating compositions according to claim 1, wherein the basic and acid groups in the stated ratio are present in a single resin molecule.

7. Coating compositions according to claim 1, including pigments.

8. Coating compositions according to claim 1, including additional cross-linkers.

9. Coating compositions of claim 1, wherein the basic macromolecular component is the addition reaction product of an epoxy compound and a secondary amine.

10. Coating compositions according to claim 1, wherein the basic macromolecular component is a copolymer including a basic monomer selected from the group consisting of N,N-dimethyl-aminoethyl (meth) acrylate, vinyl piridine, N-vinylimidazol, and N-vinylcarbozol.

11. Coating compositions according to claim 10, wherein the copolymer includes hydroxyalkyl (meth) acrylates.

* * * * *